US010645281B1

(12) United States Patent
Yu (10) Patent No.: US 10,645,281 B1
(45) Date of Patent: May 5, 2020

(54) METHOD AND SYSTEM FOR SNAPSHOT MULTI-SPECTRAL LIGHT FIELD IMAGING

(71) Applicant: SHANGHAITECH UNIVERSITY, Shanghai (CN)

(72) Inventor: Jingyi Yu, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 16/677,984

(22) Filed: Nov. 8, 2019

Related U.S. Application Data

(63) Continuation of application No. PCT/CN2017/085148, filed on May 19, 2017.

(51) Int. Cl.
*H04N 5/232* (2006.01)
*H04N 5/225* (2006.01)
(Continued)

(52) U.S. Cl.
CPC ........ *H04N 5/23232* (2013.01); *G01J 3/2823* (2013.01); *G02B 17/0848* (2013.01); *G06T 3/4053* (2013.01); *G06T 5/006* (2013.01); *G06T 5/50* (2013.01); *G06T 7/571* (2017.01); *H04N 5/22541* (2018.08); *G01J 2003/2826* (2013.01);
(Continued)

(58) Field of Classification Search
CPC ........... H04N 13/0282; H04N 5/23232; H04N 5/22541; G06T 2207/10052; G06T 2200/21; G06T 5/50; G06T 7/571; G06T 3/4053; G06T 5/006; G06T 2207/20081;
(Continued)

(56) References Cited

U.S. PATENT DOCUMENTS 7,298,922 B1 * 11/2007 Lindgren .............. G06T 3/4061
342/25 A
2007/0230944 A1 * 10/2007 Georgiev ........... H04N 5/23212
396/322
(Continued)

FOREIGN PATENT DOCUMENTS

| CN | 102542549 A | 7/2012 |
|---|---|---|
| CN | 103208102 A | 7/2013 |
| CN | 106651820 A | 5/2017 |
| WO | 2013-064510 A1 | 5/2013 |

OTHER PUBLICATIONS

PCT International Search Report and the Written Opinion dated Jan. 29, 2018, issued in corresponding International Application No. PCT/CN2017/085148 (11 pages).

*Primary Examiner* — Abdelaaziz Tissire
(74) *Attorney, Agent, or Firm* — Sheppard Mullin Richter & Hampton LLP (57) ABSTRACT

A method for generating high resolution multi-spectral light fields is disclosed. The method may include capturing a multi-perspective spectral image which includes a plurality of sub-view images; aligning and warping the sub-view images to obtain low resolution multi-spectral light fields; obtaining a high resolution dictionary and a low resolution dictionary; obtaining a sparse representation based on the low resolution multi-spectral light fields and the low resolution dictionary; and generating high resolution multi-spectral light fields with the sparse representation and the high resolution directory. Each sub-view image is captured with a different perspective and a different spectral range. The multi-perspective spectral image is obtain with one exposure.

23 Claims, 6 Drawing Sheets

(51) Int. Cl.
  *G01J 3/28*   (2006.01)
  *G06T 5/50*   (2006.01)
  *G06T 3/40*   (2006.01)
  *G06T 5/00*   (2006.01)
  *G02B 17/08*  (2006.01)
  *G06T 7/571*  (2017.01)
(52) U.S. Cl.
  CPC .............. *G06T 2200/21* (2013.01); *G06T 2207/10052* (2013.01); *G06T 2207/20081* (2013.01)
(58) Field of Classification Search
  CPC ............ G02B 17/0848; G01J 3/2823; G01J 2003/2826
  See application file for complete search history.

(56) References Cited

U.S. PATENT DOCUMENTS

| | | | | |
|---|---|---|---|---|
| 2010/0020187 A1* | 1/2010 | Georgiev | ........... | H04N 5/23212 348/218.1 |
| 2011/0073752 A1* | 3/2011 | Berkner | ................ | G01J 1/0492 250/227.2 |
| 2012/0127351 A1* | 5/2012 | Vlutters | .................... | G01J 3/02 348/266 |
| 2015/0116526 A1* | 4/2015 | Meng | ........................ | G06T 5/50 348/218.1 |
| 2015/0187047 A1* | 7/2015 | Lumsdaine | ........ | H04N 5/23229 382/280 |
| 2015/0276478 A1* | 10/2015 | Geelen | ................. | G01J 3/0256 356/454 |
| 2019/0096044 A1* | 3/2019 | Kim | ........................ | G06T 5/006 |

\* cited by examiner

METHOD AND SYSTEM FOR SNAPSHOT MULTI-SPECTRAL LIGHT FIELD IMAGING

CROSS-REFERENCE TO RELATED APPLICATION

This application is a continuation application of International Patent Application No. PCT/CN2017/085148, filed on May 19, 2017 and entitled "METHOD AND SYSTEM FOR SNAPSHOT MULTI-SPECTRAL LIGHT FIELD IMAGING." The above-referenced application is incorporated herein by reference in its entirety.

TECHNICAL FIELD

The disclosure relates generally to a snapshot plenoptic imaging system, and more particularly, to a method and system for generating high resolution multi-spectral light fields.

BACKGROUND

A complete light field, which is also called plenoptic function, has six dimensions. They are two spatial dimensions, two angular dimensions, one spectral dimension and one temporal dimension. A light field (LF) camera, also known as a plenoptic camera, captures light travelling in every direction through a scene. That is, contrasted with a conventional camera, which records only light intensity, an LF camera captures both the intensities and the directions of the light rays. This enables sophisticated data processing even after the image data is captured. One can for example virtually change focus or perspective, or estimate depth maps from a single exposure.

However, the traditional LF cameras, for example, Lytro, Raytrix, etc., using a micro-lens array, may only record four dimensions of the light field, i.e., two spatial and two angular dimensions. In this disclosure, we propose a new snapshot plenoptic imaging (SPI) system that is able to capture 5D multi-spectral light fields (MLFs)—two spatial, two angular and one spectral dimensions, in a single exposure. This SPI system utilizes spectral-coded catadioptric mirrors, and can generate 5D MLFs with a resolution of no more than 5 nm.

SUMMARY

One aspect of the present disclosure is directed to a method for generating high resolution multi-spectral light fields. The method may include capturing a multi-perspective spectral image which includes a plurality of sub-view images; aligning and warping the sub-view images to obtain low resolution multi-spectral light fields; obtaining a high resolution dictionary and a low resolution dictionary; obtaining a sparse representation based on the low resolution multi-spectral light fields and the low resolution dictionary; and generating high resolution multi-spectral light fields with the sparse representation and the high resolution directory. Each sub-view image is captured with a different perspective and a different spectral range. The multi-perspective spectral image is obtained with one exposure.

Another aspect of the present disclosure is directed to a snapshot plenoptic imaging system for capturing images to generate high resolution multi-spectral light fields. The system may include a plurality of spectral-coded catadioptric mirrors, a digital camera and an image processing unit. Each catadioptric mirror is coated with a different spectral reflective coating. The digital camera is configured to capture a multi-perspective spectral image. The multi-perspective spectral image includes a plurality of sub-view images and each sub-view image is captured with a different perspective and a different spectral range. The image processing unit is configured to align and warp the sub-view images to obtain low resolution multi-spectral light fields. Based on the low resolution multi-spectral light fields, high resolution multi-spectral light fields can be generated.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

FIG. 2 (a) is graphical representation illustrating a data capturing unit of a snapshot plenoptic imaging system, FIG. 2 (b) is a photograph of an exemplary prototype of the data capturing unit, consistent with exemplary embodiments of the present disclosure.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

In accordance with embodiments of the present disclosure, an SPI system including a data capturing unit and a data processing unit is provided. The data capturing unit captures a multi-perspective spectral image and transmits it to the data processing unit. The data processing unit performs ray-wise distortion correction, spectral image registration and spectral signal recovery. The ray-wise distortion correction corrects view distortions in the multi-perspective spectral image. The spectral image registration is to align and warp sub-view images of the multi-perspective spectral image to generate low resolution MLFs. The spectral signal recovery is to generate high resolution MLFs based on the low resolution MLFs.

1. System Overview

Figure 1:
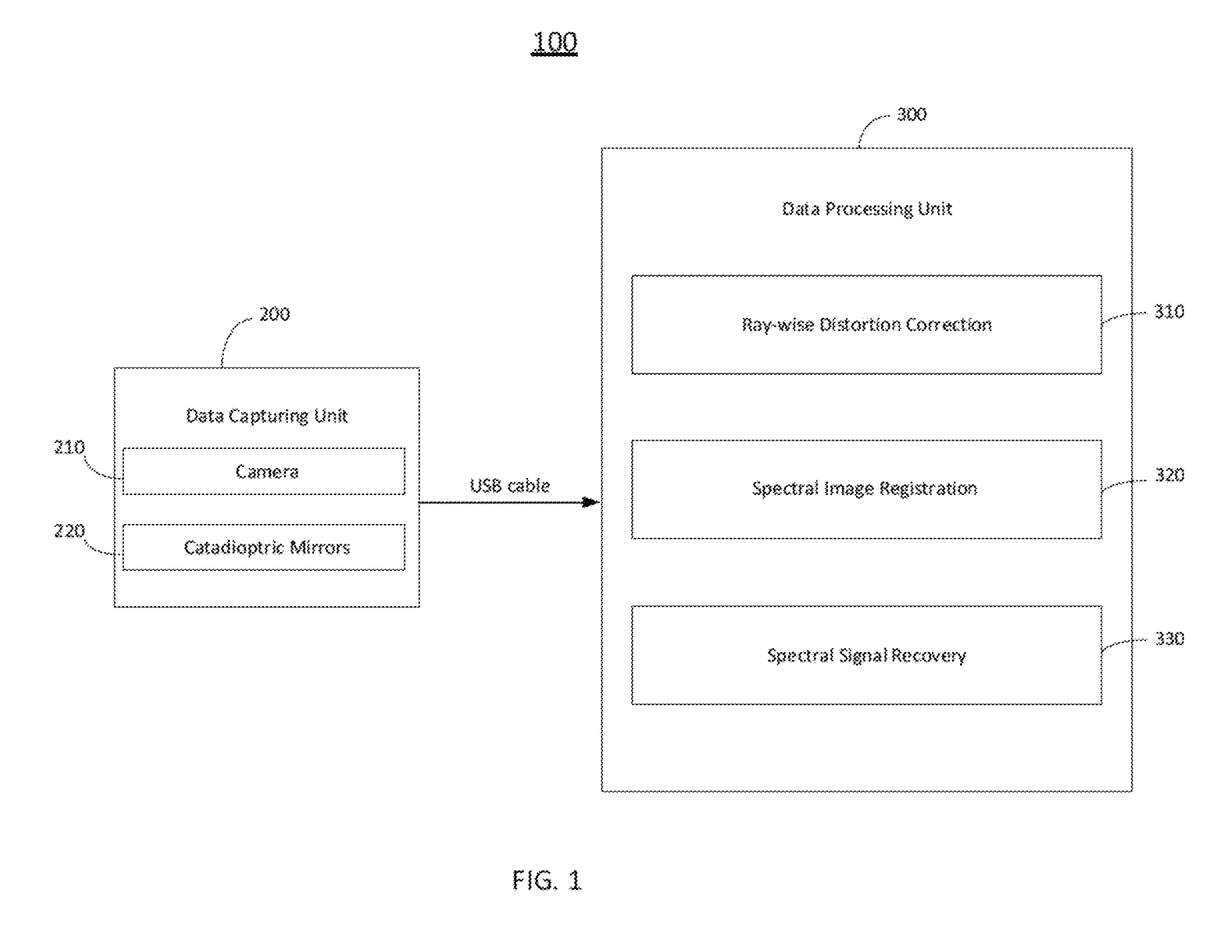
FIG. 1 is a schematic diagram for a snapshot plenoptic imaging system, consistent with exemplary embodiments of the present disclosure.

FIG. 1 shows an exemplary SPI system 100 in accordance with an embodiment of the present disclosure. The system 100 may include a number of components, some of which may be optional. In some embodiments, the system 100 may include many more components than those shown in FIG. 1. However, it is not necessary that all of these components be shown in order to disclose an illustrative embodiment.

As shown in FIG. 1, the system 100 may include a data capturing unit 200 and a data processing unit 300. The data capturing unit 200 may include a digital camera 210 and a plurality of catadioptric mirrors 220. The data processing unit 300 may include a ray-wise distortion correction unit 310, a spectral image registration unit 320 and a spectral signal recovery unit 330.

2. Data Capturing Unit

Figure 2:
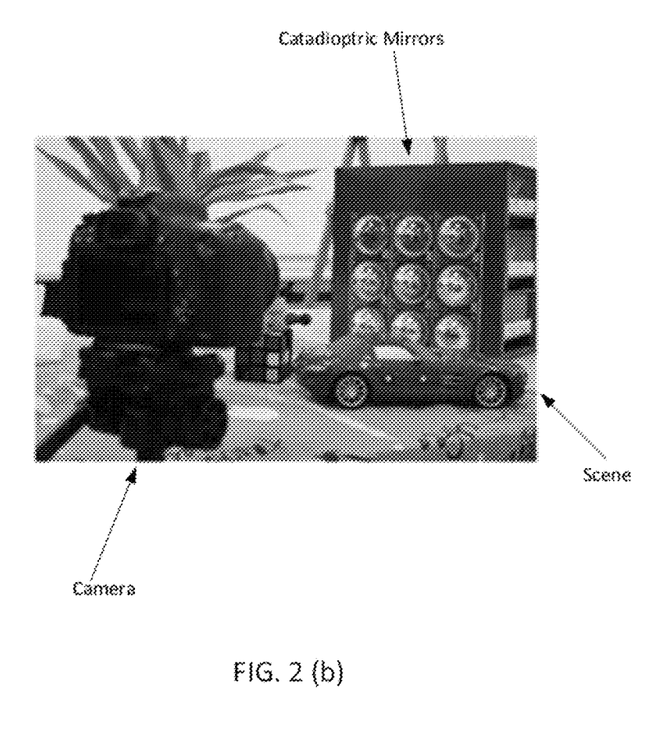

FIG. 2 (*a*) is a graphical representation illustrating the data capture unit 200 in accordance with an embodiment of the present disclosure. As shown in FIG. 2 (*a*), the data capturing unit 200 may include a camera 210 and a plurality of catadioptric mirrors 220. In some embodiments, the camera 210 may be a commercially available digital single-lens reflex (DSLR) camera. The plurality of catadioptric mirrors 220 may include 9 spectral-coded catadioptric mirrors. Each of the catadioptric mirrors may include a different spectral reflective coating, so that each catadioptric mirror reflects light in a different spectral range. The catadioptric mirrors may have a spherical surface. The 9 catadioptric mirrors may be mounted to acrylic lens holders in a 3×3 array. The DSLR camera may be placed 2 meters away from the catadioptric mirrors and connected to a computer via a USB cable. FIG. 2 (*b*) shows a photograph of an exemplary data capturing unit 200. Configuration parameters of an exemplary data capturing unit are listed in Table 1.

TABLE 1

| | |
|---|---|
| Mirror Type | Spherical |
| Material | BK7 Glass |
| Radius | 32.5 mm |
| Baseline | 70.0 mm |
| Coating Type | Spectral reflective coating |
| Spectral Range | 400 nm-700 nm |
| Sensor Resolution | 5760 × 3840 |
| Field-of-View | >100° |
| Spectral Resolution | <10 nm |
| MLF Resolution | 1000 × 1000 × 3 × 3 × 30 |

2.1 Data Capturing Method

As shown in FIG. 2 (*b*), when capturing images, a scene of interest may be placed between the DSLR camera and the catadioptric mirrors. In some embodiments, the scene is placed behind the camera. The DSLR camera captures one multi-perspective image at one exposure with the light reflected by the catadioptric mirrors. In some embodiments, the catadioptric mirrors are spectral-coded and placed in a 3×3 array. Each multi-perspective image includes 3×3 sub-view images. Receiving reflected lights from the spectral-coded catadioptric mirrors, each of the sub-view images is captured with a different perspective and a different spectral range. The captured multi-perspective image may be transmitted by a USB cable to the data processing unit 300.

3. Data Processing Unit

As shown in FIG. 1, the data processing unit 300 includes a ray-wise distortion correction unit 310, a spectral image registration unit 320 and a spectral signal recovery unit 330.

3.1 Ray-Wise Distortion Correction

Figure 3:
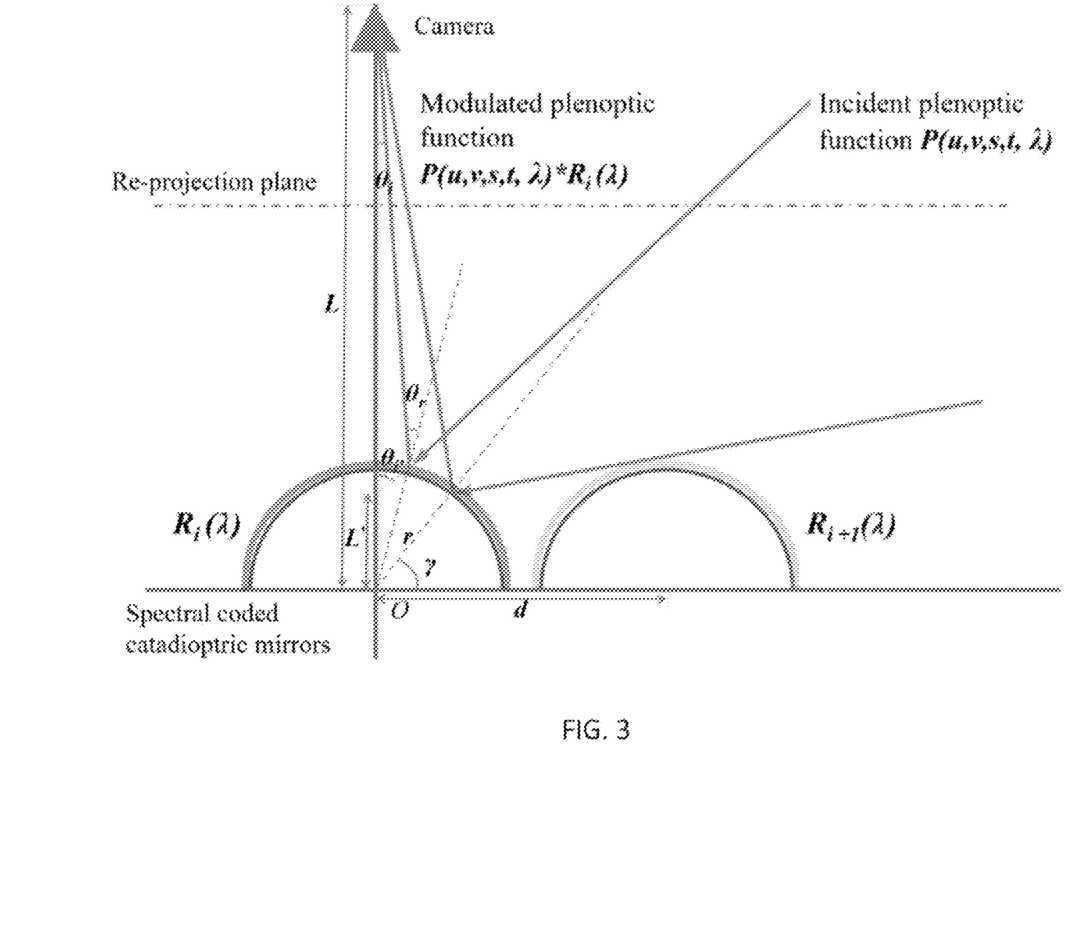
FIG. 3 is a diagram illustrating geometry of catadioptric mirrors, consistent with exemplary embodiments of the present disclosure.

The use of catadioptric mirrors provides a wide field of view (FOV), and also causes strong view distortions in the captured images. Each of the multi-perspective image includes 9 distorted sub-view images from different perspectives. To correct the distortions in the sub-view images with different perspectives, a ray-wise distortion correction method can be applied by analyzing reflectance geometry of the catadioptric mirrors and re-projecting each pixel (ray) to a virtual focal plane. The sub-view images present non-single view projections of the scene, since each of the sub-view image is captured at a different perspective. Since baselines between any two adjacent sub-view images are the same, the distorted sub-view images may be re-projected by using geometric modeling as illustrated in FIG. 3. A baseline is the distance between adjacent sub-view images in pixel, usually measured in unit of mm.

In FIG. 3, a spherical mirror of radius r is located at the origin O, and a camera aims at the sphere at a distance l. A ray of an incident angle $\theta_i$ is reflected by the spherical surface with an angle of reflectance $\theta_r$. In a 3D free space, all incident rays with the same $\theta_i$ are re-projected to a bundle of rays with $\theta_i'$ by a virtual camera placed at l' on the axis. Due to the fact that the camera is very far away from the mirrors: l≫r, the virtual camera position can be considered approximately as a constant within a desired FOV. Thus, $$\tan \theta_i \cdot (l - r \sin \gamma) = r \cos \gamma$$

where γ is the direction of surface normal. For any given $\theta_i$, γ can be obtained as:

$$\gamma = \sin^{-1}\left(\frac{l \cdot \tan^2\theta_i + \sqrt{r^2\tan^4\theta_i - l^2\tan^2\theta_i + r^2}}{r(1 + \tan^2\theta_i)}\right)$$

Based on the law of reflection, the equivalent incident $\theta_i'$ and l' can be obtained as follows:

$$\theta_i' = \theta_i - 2\gamma + \pi$$

$$l' = r\sin\gamma - \frac{r\cos\gamma}{\tan\theta_i'}$$

A virtual focal plane can be defined by the position of the virtual camera, i.e., l'. According to the above-discussed equations, setting an FOV as 100°, the equivalent incident $\theta_i'$ and l' can be obtained for all incident rays. By re-projecting each pixel (ray) to the virtual focal plane, the sub-view image from one catadioptric mirror can be corrected from view distortions. The geometric modeling of a single catadioptric mirror can be simply extended to a mirror array due to the mirror's rotational symmetry of its spherical surface. In some embodiments, the distance from the camera to a catadioptric mirror/may not be a constant for all mirrors in a planar array configuration.

2.2 Spectral Image Registration

The multi-perspective image with the corrected sub-view images is transmitted to the spectral image registration 320 for spectral image registration. The objective of the spectral image registration is to align and warp the sub-view images to any perspective so that a datacube of a multi-spectral light field can be constructed on each perspective. In other words, for each particular sub-view image, align and warp the other sub-view images to the particular sub-view image. Then on each perspective, a datacube, which includes a light field of a plurality of different spectral bands can be constructed. Here, a band refers to a section of light spectrum. In some embodiments, a multi-perspective image may include 9 different perspectives and 9 different spectral bands. By performing the spectral image registration on the multi-perspective image, 9 multi-spectral datacubes, each of which includes 9 spectral bands, are constructed on each perspective respectively. These MLFs included in these datacubes are called low resolution MLFs in this disclosure.

Figure 4:
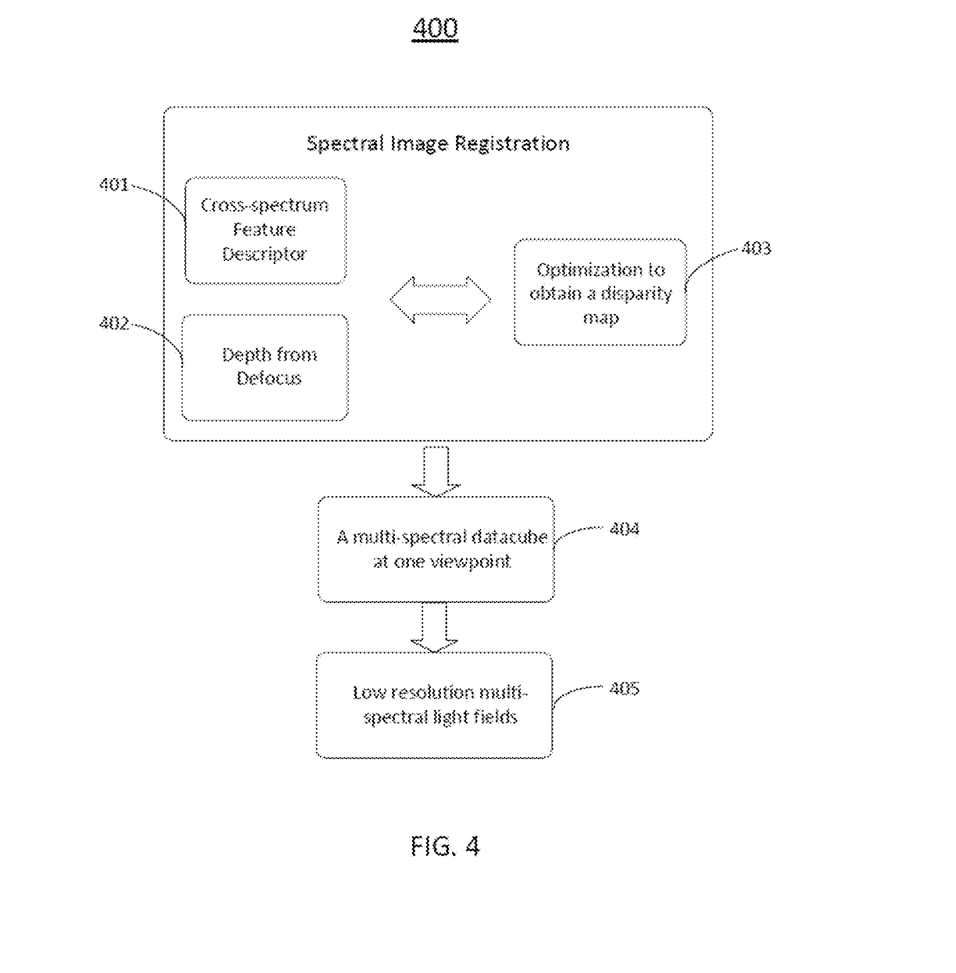
FIG. 4 is a flow diagram illustrating a method of spectral image registration, consistent with exemplary embodiments of the present disclosure.

Traditional image registration methods, such as, patch-based stereo, optical flow, etc., fail to register spectral images, as the spectral images share no intensity consistency. This disclosure presents a spectral image registration method to obtain disparity maps by utilizing both a cross-spectrum feature descriptor and depth from defocus technique. This method can align spectral images and generate high quality disparity maps, and warp the sub-view images to each other based on the disparity maps. FIG. 4 shows a flow diagram illustrating the method of spectral image registration in accordance with an exemplary embodiment of the present disclosure.

2.2.1 Cross-Spectrum Feature Descriptor

A feature descriptor is a type of feature representation chosen to stand for a feature in image processing. In this disclosure, the robust selective normalized cross correlation (RSNCC), is adopted as a cross-spectrum feature descriptor. RSNCC is a robust matching metric for spectral images.

At step 401, by using RSNCC, pixel correspondence among the sub-view images can be established. The detailed computational process may be explained in the following equations. Denoting a central view as $I_1$ and its neighboring view as $I_2$, a matching cost function $E_{rsncc}$ can be computed as:

$$E_{rsncc}(d, p) = f(1 - NCC(I_1, I_2, d, p)) + f(1 - NCC(M[I_1], M[I_2], d, p))$$

$$f(x) = -\log(e^{-|x|} + e^{|x|-2})$$

$$NCC(I_1, I_2, d, p) = \frac{(I_1(p) - \overline{I_1(p)}) \cdot (I_2(p + d) - \overline{I_2(p + d)})}{\|I_1(p) - \overline{I_1(p)}\| \cdot \|I_2(p + d) - \overline{I_2(p + d)}\|}$$

Here, d is a pixel disparity, p is a pixel position, $M[I_1]$ and $M[I_2]$ stand for gradient magnitudes of images $I_1$ and $I_2$. $I_1(p)$ and $I_2(p+d)$ are pixels' feature vectors in path p in $I_1$ and patch p+d in $I_2$ respectively. $\overline{I_1(p)}$ is the average value of a patch of pixels centered at p. $NCC(I_1, I_2, d, p)$ is the normalized cross correlation between the patch center at p in $I_1$ and patch p+d in $I_2$ in the intensity or color space. It represents structure similarity of the two patches under feature I even if the two patches are transformed in color and geometry locally. $f( )$ is the robust selective function to help remove outliers. The outliers include structure divergence caused by shadow, highlight, etc. The robust selective function is effective in image matching and makes RSNCC continuous and solvable by continuous optimization. The computation results a matching function $E_{rsncc}$ representing the pixel correspondence among the sub-view images.

2.2.2 Depth from Defocus

At step 402, differences in the depth of views (DOVs) of sub-view images can be estimated by a depth from defocus technique. The depth from defocus technique is a method that estimates a scene depth from a stack of refocused images with a shallow DOV. The depth from defocus method can be performed by fusing a multi-spectral focal stack. The multi-spectral focal stack, including a plurality of views: $I_1, I_2, \ldots$ can be generated by refocusing the multi-spectral light field at a serial of depths. Then a patch-wise refocusing energy metric can be computed as:

$$E_{rf}(d, p) = -\frac{M[I_d(d, p)]}{\sum_{i \in U} M[I_d(d, i)]}$$

Here, M[ ] stands for a gradient magnitude of an image, U is a small patch centered at p.

2.2.3 Optimization

At step 403, a disparity map for each perspective can be obtained by optimizing an energy function. The energy function utilizes both results from RSNCC and the depth from defocus, and can be constructed as following:

$$E(d,p) = \alpha \cdot E_{rsncc}(d,p) + \beta \cdot E_{rf}(d,p) + P(d,p)$$

Here, α and β are weight coefficients, and P(d,p) is a smooth penalty. The disparity map can be defined as:

$$D_{map}(p) = \underset{d}{\mathrm{argmin}} \sum E(d, p)$$

This is an optimization problem, and can be solved by graph cuts algorithm. "Graph cuts" is a type of algorithm used to solve a variety of energy minimization problems which employ a max-flow/min-cut optimization. At step 404, other sub-view are warped to the central view using the disparity map $D_{map}(p)$, so that a multi-spectral datacube at the central view can be obtained. At step 405, the same registration and warping process are repeated for every perspective, and 9 multi-spectral datacubes can be obtained. Accordingly, the low resolution MLFs can be obtained at step 405.

2.3 Spectral Signal Recovery

The low resolution MLFs have a low spectral resolution, including only 9 spectral bands. Traditional SPI solutions are also limited to either spectral or spatial resolution. To overcome these limitations and increase spectral resolution, the SPI system, in some embodiments, can adopt a sparse reconstruction algorithm to generate high resolution multi-spectral light fields. The sparse reconstruction algorithm is a learning-based reconstruction algorithm, which is used for acquiring, representing and compressing high-dimensional signals. The multi-spectral signals can be sparsely represented under an over-complete dictionary, and the spectral sparsity of the multi-spectral signals allows compressed sensing of the signals. Compressed sensing (also known as compressive sensing, compressive sampling, or sparse sampling) is a signal processing technique for efficiently acquiring and reconstructing a signal, by finding solutions to underdetermined linear systems. This is based on the principle that, through optimization, the sparsity of a signal can be exploited to recover it from far fewer samples than required by the Shannon-Nyquist sampling theorem. Representing a signal involves the choice of the so-called "dictionary", which is a set of elementary signals used to decompose the signal. When the dictionary forms a basis, the signal can be uniquely represented as a linear combination of the elementary signals. "Over-complete" indicates that the number of basis is more than the dimensionality of the signals. Finding a sparse representation of a signal in a given over-complete dictionary is to find the corresponding sparse coefficients in the linear combination of the elementary signals.

The spectral-coded catadioptric mirrors are able to sense the 5D plenoptic function compressively. Therefore, the high resolution MLFs can be generated computationally by using a spectral dictionary. A spectral dictionary can be learned from a publicly available multi-spectral image database. In some embodiments, the database can be retrieved from http://www.cs.columbia.edu/CAVE/databases/multi-spectral/. The database consists of 32 scenes, and each scene includes full spectral resolution reflectance data from 400 nm to 700 nm at 10 nm steps (31 bands total). With the obtained dictionary, the sparse reconstruction algorithm is able to improve the low resolution MLFs to a high resolution MLFs from 30 nm to no more than 10 nm.

Figure 5:
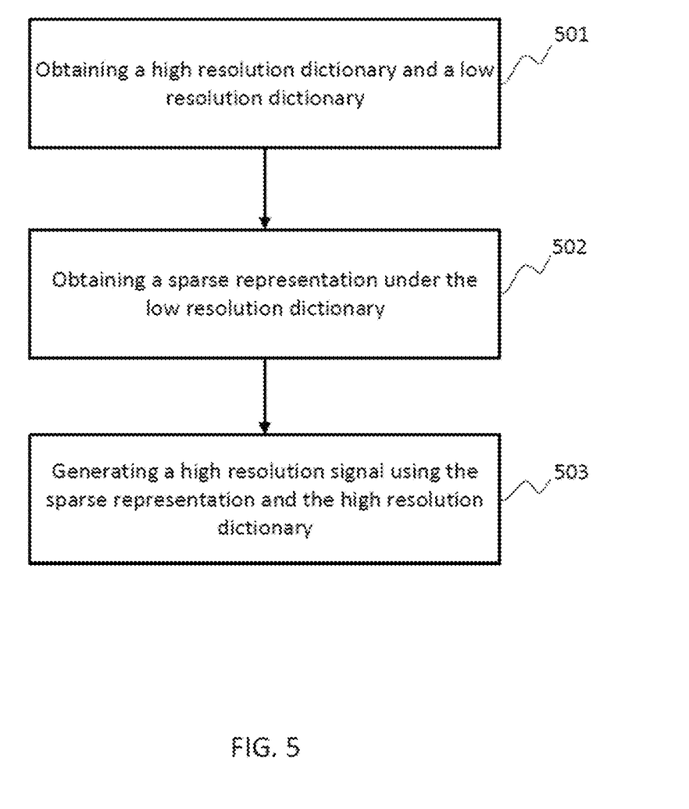
FIG. 5 is a flow diagram illustrating a method for spectral signal recovery, consistent with exemplary embodiments of the present disclosure.

The obtained low resolution MLFs are input to the spectral signal recovery unit 330. FIG. 5 shows a flow diagram illustrating the method for generating high resolution MLFs in accordance with the exemplary embodiment of the present disclosure.

At step 501, two dictionaries can be obtained from the publicly available multi-spectral database: a high resolution dictionary $D_h$ and a corresponding low dictionary $D_l$. Both are used to generate the high resolution multi-spectral high fields. The detailed method can be explained as following.

Given a training set of high resolution spectral signals: $h_1$, $h_2$, ..., which is obtained from the publicly available database, two dictionaries can be obtained by solving a $l_1$ norm optimization problem. The $l_1$ norm optimization problem is a technique commonly used in compressed sensing. In one exemplary embodiment, the sparse reconstruction algorithm can be represented as following:

$$D^* = \underset{D'}{\operatorname{argmin}} \frac{1}{n} \sum_{i=1}^{n} \frac{1}{2} \|h_i' - D' \cdot \beta_i\|_2^2 + \lambda \|\beta_i\|_1$$

Here $\beta_i$ is a sparse coefficient, and $\|\beta_i\|_1$ is a term used to penalize $\beta_i$ for not being sparse. The first term is a reconstruction term which tries to force the algorithm to provide a good representation of $h_i'$ and the second term is a sparsity penalty which forces the representation of $h_i'$ to be sparse. $\lambda$ is a scaling constant to determine the relative importance of these two contributions.

$$D' = \begin{pmatrix} D_h \\ D_l \end{pmatrix} \quad h_i' = \begin{pmatrix} h_i \\ S \cdot h_i \end{pmatrix}$$

where S is a known sampling matrix. Denoting spectral reflectance function of the 9 mirrors as $R_1, R_2, \ldots R_9$ and Bayer filter's quantum efficiency as $B_R$, $B_G$, $B_B$, the sampling matrix S is composed as:

$$S = \begin{bmatrix} B_R(\lambda_{min})*R_1(\lambda_{min}) & \ldots & B_R(\lambda_{max})*R_1(\lambda_{max}) \\ \vdots & \ddots & \vdots \\ B_R(\lambda_{min})*R_9(\lambda_{min}) & \ldots & B_R(\lambda_{max})*R_9(\lambda_{max}) \\ B_G(\lambda_{min})*R_1(\lambda_{min}) & \ldots & B_G(\lambda_{max})*R_1(\lambda_{max}) \\ \vdots & \ddots & \vdots \\ B_G(\lambda_{min})*R_9(\lambda_{min}) & \ldots & B_G(\lambda_{max})*R_9(\lambda_{max}) \\ B_B(\lambda_{min})*R_1(\lambda_{min}) & \ldots & B_B(\lambda_{max})*R_1(\lambda_{max}) \\ \vdots & \ddots & \vdots \\ B_B(\lambda_{min})*R_9(\lambda_{min}) & \ldots & B_B(\lambda_{max})*R_9(\lambda_{max}) \end{bmatrix}$$

Here, $\lambda_{min}$ and $\lambda_{max}$ stand for a minimum wavelength and a maximum wavelength of an interested spectrum. Two dictionaries $D_h$ and $D_l$ are co-trained so that the high and low resolution multi-spectral signals ($h_i$ and $S \cdot h_i$) have the same sparse representation, $\hat{\beta}$, a set of $\beta_i$, with respect to the dictionaries.

At step 502, a sparse representation, $\hat{\beta}$, can be obtained based on the two dictionaries. As discussed previously, the SPI system senses the compressed MLFs. Low resolution (9 bands) MLFs can be obtained by performing the distortion correction and image registration. For each of the low resolution spectral signal l in the light fields, its corresponding sparse representation under the low resolution dictionary $D_l$ can be solved using LASSO method. LASSO stands for absolute shrinkage and selection operator, and is a regression analysis that performs both variable selection and regulation in order to enhance the prediction accuracy and interpretability of the statistical model it produces. Accordingly, the sparse representation $\hat{\beta}$ can be solved by the following function:

$$\hat{\beta} = \underset{\beta}{\operatorname{argmin}} \frac{1}{2} \|l - D_l \cdot \beta\|_2^2 \quad \text{s.t.} \quad \|\beta\|_1 < k$$

Here, k is a sparse parameter.

Since the high and low resolution spectral signals have the same sparse representation $\hat{\beta}$, with respect to the dictionaries, the high resolution spectral signal h can be generated using the sparse representation and the high resolution dictionary as following:

$$h = D_h \cdot \hat{\beta}$$

Accordingly, at step 503, the high resolution MLFs can be generated by using the sparse representation and the high resolution dictionary.

The SPI system has the following advantages: 1. It is the first single sensor solution to capture a 5D plenoptic function. Previous solutions employ either a hybrid sensor system or a sensor array to acquire high dimensional light fields. These architectures are bulky in size and expensive. The SPI system in this disclosure uses a single commercial DSLR camera and an optical unit (mirror array) which is portable and less expensive. The single sensor property requires no synchronization, while the synchronization can be very challenging for multiple sensor arrays.

2. The snapshot property of the SPI system provides a potential for acquiring temporal dimensions. Unlike scanning-based spectral imaging techniques, the SPI records the compressed MLFs in a single exposure, and is applicable for capturing dynamic scene or even multi-spectral light field videos.

3. Due to the rotational symmetry of spherical mirrors, there is no need to calibrate the orientation of any individual mirror, which is convenient for users to increase the number of mirrors. Also, the spectral range of the SPI system can be extended by replacing some of the mirrors. In some embodiments, the SPI system measures only visible spectral; and in some other embodiments, the system can acquire near infra-red and ultra violet information by using additional spectral-coded mirrors or auxiliary flash devices.

Figure 6:
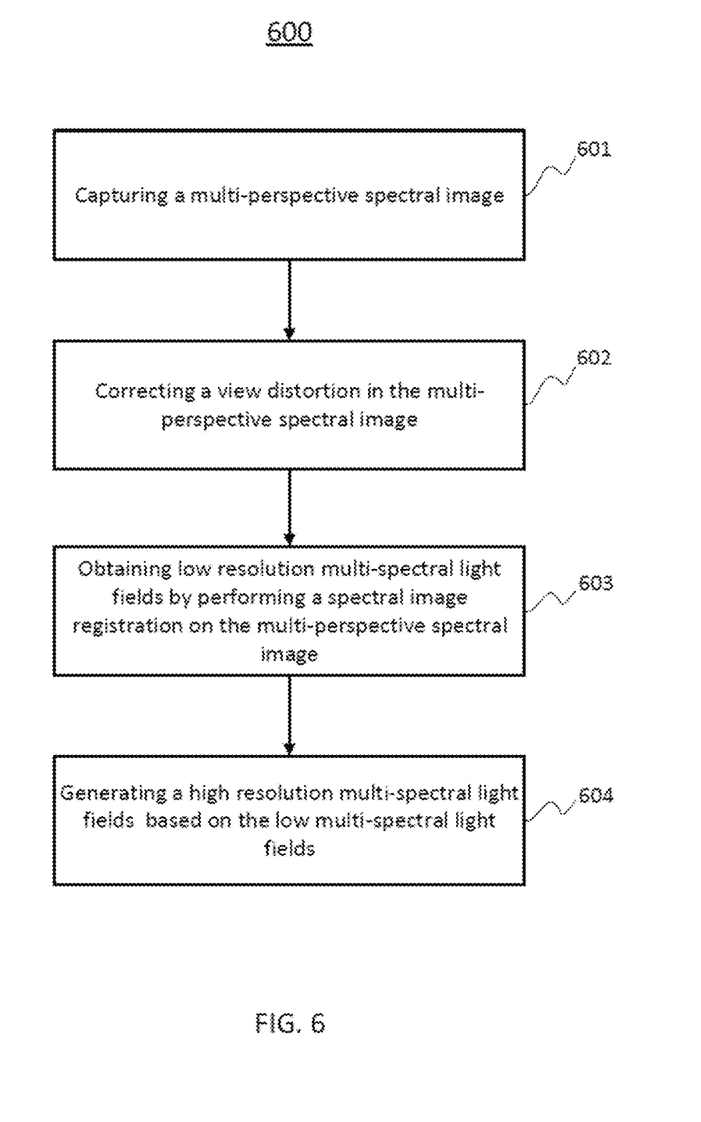
FIG. 6 is flow diagram illustrating a method for generating high resolution multi-spectral light fields by a snapshot plenoptic imaging system, consistent with exemplary embodiments of the present disclosure.

FIG. 6 illustrates a method for generating high resolution MLFs by the SPI, in accordance with an embodiment of the present disclosure. At step 601, a multi-perspective spectral image is captured; at step 602, the captured multi-perspective spectral image is corrected from a view distortion by the ray-wise distortion correction method; at step 603, the sub-view images of the multi-perspective spectral image are aligned and warped to generate low resolution MLFs; and at step 604, the high resolution MLFs are obtained based on the low resolution MLFs and the high and low resolution dictionaries.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for generating high resolution multi-spectral light fields, comprising:
    capturing a multi-perspective spectral image with one exposure, wherein the multi-perspective spectral image includes a plurality of sub-view images and each sub-view image is captured with a different perspective and a different spectral range;
    aligning and warping the sub-view images to obtain low resolution multi-spectral light fields;
    obtaining a high resolution dictionary and a low resolution dictionary;
    obtaining a sparse representation based on the low resolution multi-spectral light fields and the low resolution dictionary; and
    generating high resolution multi-spectral light fields with the sparse representation and the high resolution directory.

2. The method of claim 1, wherein the high resolution directory and the low resolution directory are co-trained.

3. The method of claim 1, further comprising:
    using a robust selective normalized cross correlation to obtain a pixel correspondence among the sub-view images.

4. The method of claim 1, further comprising:
    estimating differences in depth of views of the sub-view images by a depth from defocus technique.

5. The method of claim 1, wherein the sub-view images are warped to each other by using a disparity map.

6. The method of claim 1, further comprising:
    correcting view distortions in the multi-perspective spectral image by analyzing reflectance geometry and re-projecting each pixel to a virtual focal plane.

7. The method of claim 1, wherein the low resolution multi-spectral light fields include nine spectral bands.

8. The method of claim 1, wherein the high resolution multi-spectral light fields have a resolution of no more than 5 nm.

9. The method of claim 1, further comprising:
    capturing the multi-perspective spectral image using a digital camera and a plurality of spectral-coded catadioptric mirrors.

10. The method of claim 9, wherein each catadioptric mirror is coated with a different spectral reflective coating.

11. The method of claim 9, wherein the catadioptric mirrors form a 3×3 array.

12. The method of claim 9, wherein each catadioptric mirror has a spherical surface.

13. A snapshot plenoptic imaging system for capturing images to generate high resolution multi-spectral light fields, the system comprising:
    a plurality of spectral-coded catadioptric mirrors, wherein each catadioptric mirror is coated with a different spectral reflective coating;
    a digital camera configured to capture a multi-perspective spectral image, wherein the multi-perspective spectral image includes a plurality of sub-view images and each sub-view image is captured with a different perspective and a different spectral range; and
    an image processing unit configured to align and warp the sub-view images to obtain low resolution multi-spectral light fields and generate high resolution multi-spectral light fields based on the low resolution multi-spectral light fields.

14. The system of claim 13, wherein the image processing unit is configured to obtain a high resolution dictionary and a low resolution dictionary; obtain a sparse representation based on the low resolution multi-spectral light fields and the low resolution dictionary; and generate the high resolution multi-spectral light fields with the sparse representation and the high resolution directory.

15. The system of claim 13, wherein the high resolution directory and the low resolution directory are co-trained.

16. The system of claim 13, wherein the image processing unit is configured to use a robust selective normalized cross correlation to obtain a pixel correspondence among the sub-view images.

17. The system of claim 13, wherein the image processing unit is configured to estimate differences in depth of views of the sub-view images by a depth from defocus technique.

18. The system of claim 13, wherein the sub-view images are warped to each other by using a disparity map.

19. The system of claim 13, wherein the image processing unit is configured to correct view distortions in the multi-perspective spectral image by analyzing reflectance geometry and re-projecting each pixel to a virtual focal plane.

20. The system of claim 13, wherein the low resolution multi-spectral light fields include nine spectral bands.

21. The system of claim 13, wherein the high resolution multi-spectral light fields have a resolution of no more than 5 nm.

22. The system of claim 13, wherein the catadioptric mirrors form a 3×3 array on a plane.

23. The system of claim 13, wherein each catadioptric mirror has a spherical surface.

* * * * *